United States Patent [19]
Mito et al.

[11] 4,428,398
[45] Jan. 31, 1984

[54] PRESSURE CONTROL VALVE

[75] Inventors: Akio Mito, Yokohama; Kentaro Tanaka, Tokyo, both of Japan

[73] Assignee: Tokyo Keiki Co., Ltd., Tokyo, Japan

[21] Appl. No.: 355,811

[22] Filed: Mar. 8, 1982

[30] Foreign Application Priority Data

Mar. 23, 1981 [JP] Japan .................................. 56-42104

[51] Int. Cl.³ ............................................ F16K 17/06
[52] U.S. Cl. ..................................... 137/530; 137/540; 251/136; 74/409; 74/424.8 VA
[58] Field of Search ................ 137/540, 530; 251/133, 251/136; 74/409, 410, 424.8 VA; 318/159, 160

[56] References Cited

U.S. PATENT DOCUMENTS

| | | | |
|---|---|---|---|
| 1,148,478 | 7/1915 | Jepson | 74/410 |
| 2,679,167 | 5/1954 | Nichinson | 74/409 |
| 2,735,669 | 2/1956 | Seiler | 137/530 |
| 3,839,662 | 10/1974 | N'Guyen Van | 251/136 X |
| 3,856,042 | 12/1974 | Fletcher et al. | 74/424.8 VA X |
| 4,305,307 | 12/1981 | Kiunke | 74/409 |

Primary Examiner—Alan Cohan
Assistant Examiner—John A. Rivell
Attorney, Agent, or Firm—Michael F. Petock

[57] ABSTRACT

A pressure control valve including a valve, a spring for pressing the valve, and a power input means for compressing the spring further comprises a backup force-generating mechanism for producing and directing a backup force counter to the direction in which the reaction force due to the compression of the spring is exerted on the input means, so as to impart the backup force to the input means.

9 Claims, 8 Drawing Figures

PRESSURE CONTROL VALVE

This invention relates to a pressure control valve, and more specifically to a valve of the character comprising a valve, a spring as a displacement-force conversion element, and a power input means for compressing the spring.

An existing pressure control valve of the type is shown, for example, in FIG. 1. It is designed to rotate a square screw 2, threadedly held in the hollow of a valve body 1, forward or backward by a pulse motor 3 so as to increase or decrease the pressure of a spring 5 disposed between the screw 2 and a valve 4 against the valve, thereby controlling a relief pressure.

As the spring 5 in such pressure control valve of the ordinary design is progressively compressed by stepwise rotation of the pulse motor 3, a reaction force due to elastic deformation of the spring builds up until it acts as a load torque applicable to the pulse motor 3. Thus, strong compression of the spring 5 requires a great operating power input. Where a pulse motor, e.g., is chosen as the power input means, a large capacity type must be used; otherwise any high speed operation would be impossible.

In view of the above, the present invention is aimed at providing a pressure control valve including a valve, a spring for pressing the valve, and a power input means for compressing the spring and which requires only a small operating power and yet capable of high speed operation even with a small pulse motor particularly when the motor is employed as the input means, by exerting a backup force on the input means, said backup force being directed counter to the direction in which the reaction force due to compression of the spring acts on the input means and having a magnitude proportional to that of the reaction force.

The invention will be described in more detail below with reference to the accompanying drawings showing embodiments thereof.

Figure 1:
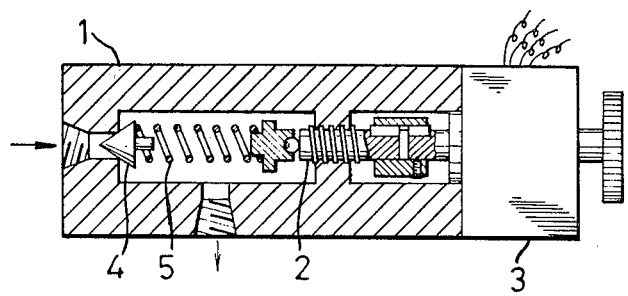
FIG. 1 is a sectional view of a conventional pressure control valve.
Figure 2:
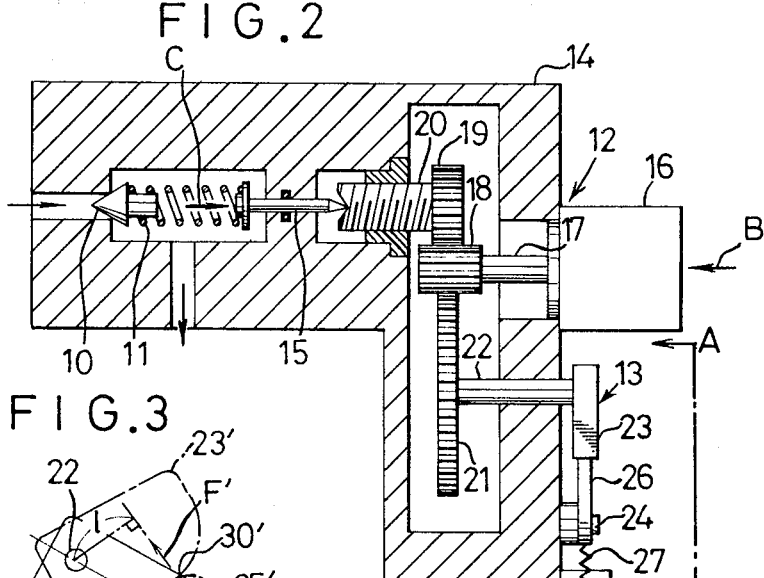
FIG. 2 is a partly sectional view of an embodiment of the pressure control valve of the invention.
Figure 3:
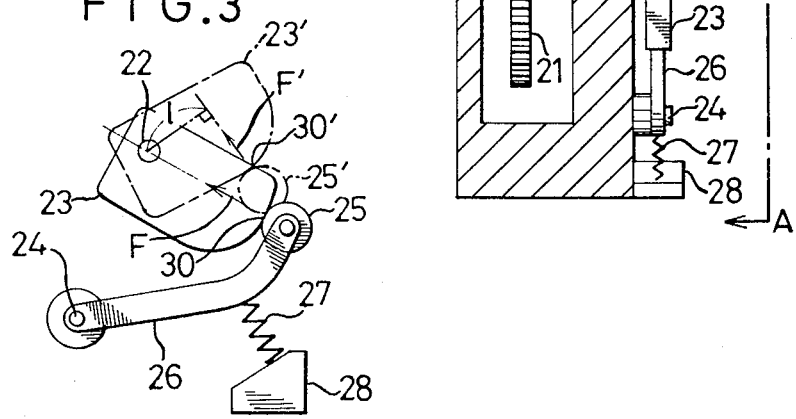
FIG. 3 is a view as seen in the direction of the arrows A—A in FIG. 2.

Referring to FIGS. 2 and 3, a preferred embodiment of the pressure control valve according to the invention is shown comprising a valve 10, a spring 11 as a displacement-force conversion element for pushing the valve, and a power input means 12 for compressing the spring. In addition, there is provided a mechanism 13 for generating a backup force directed opposite to the reaction force of the compressed spring 11 that acts on the input means 12 and is of a magnitude proportional to that of the reaction force, so that the backup force can be exerted on the input means.

In this embodiment the valve 10 of a poppet type is placed in the passage or hollow formed in the valve body 14, a push pin 15 is slidably held in the same valve body, and the spring 11 is disposed between the valve 10 and the push pin 15, which pin is engaged with the input means 12. The input means 12 comprises a rotation angle-controlled motor as rotational drive means, such as a pulse motor 16, a rotating shaft 17 of the motor, a gear 18 fixedly mounted on the shaft, another gear 19 in mesh with the gear 18, and a screw, e.g., a ball screw 20, secured to the gear 19, the screw 20 being threadedly engaged with a neck in the hollow of the valve body 14 and pivotally supporting the end of the push pin 15.

The backup force-generating mechanism 13 is made up of a gear 21 meshed with the gear 18, a rotating shaft 22 carrying the gear 21 and journaled in the valve body 14, a cam 23 for backup force generation fixedly mounted on the shaft, and a presser means for pressing the cam to impart it with a rotational force. The presser means consists of an arm 26 turnably pivoted at a base point 24 and provided with a roller 25 at the front end, the roller 25 being in contact with the cam 23, an elastic element, e.g., a spring 27, for biasing the arm 26 toward the cam 23, and a bracket 28 supporting the spring.

Next, the operation of this embodiment will be explained.

First, when the pulse motor 16 is in its original position as shown in FIG. 2, the compression of the spring 11 is zero, and therefore the reaction force of the spring 11 to be exerted on the pulse motor 16 is nil, either. In the backup force-generating mechanism 13, the cam 23 is in the state indicated by full lines in FIG. 3, in contact with the arm roller 25 at 30. The cam surface is contoured to such a radius of curvature that the line normal to the radius of the cam 23 at the contact point 30 extends through the center of the rotating shaft 22. The cam contour allows the pressing force F of the arm 26 against the cam 23 to work in the direction of the normal line, with no force produced to turn the cam 23. This keeps the backup force at naught.

Now, if the pulse motor 16 is driven for clockwise rotation as viewed in the direction of the arrow B to move the left-handed ball screw 20 forward, thereby causing the push pin 15 to compress the spring 11 to a maximum degree of displacement, the reaction force of the spring 11 will act in the direction of the arrow C against the push pin 15, with consequent application of a counterclockwise load torque to the pulse motor 16. At this point, the cam 23 is in the position indicated by alternate long and two short dashed lines in FIG. 3, in contact with the roller 25' at 30'. Thus, setting the line normal to the radius of curvature at the contacting point 30' a certain distance l apart from the rotating shaft 22 will enable the arm 26 to exert a rotating force F'×l on the cam 23'. The force, in turn, will work as a clockwise torque, or backup force, on the pulse motor 16. By suitably choosing the radius of curvature of the cam 23, the relative position of the cam 23 and the arm 26, the spring force or resiliency of the spring 27, etc., it is possible to generate a backup force equivalent to the reaction force due to compression of the spring 11, thereby to reduce the load torque on the pulse motor 16 to naught.

Also, from the original to the maximum displacement position of the pulse motor, it is possible by use of a cam 23 contoured to a suitable radius of curvature, e.g., to a gradually changed radius of curvature, to produce a backup force equal in magnitude to the reaction force of the spring 11 at any given point so as to keep the load torque on the pulse motor 16 at naught.

Since the backup force-generating mechanism according to this invention comprises the cam 23 that turns in proportion to the input displacement (e.g., the amount of compression of the spring 11) of the power input means, and the cam presser means for generating a cam-turning force that varies with the turning of the cam, the reaction force of the spring 11 and the backup force are both proportional to the input displacement, and the two are offset by each other.

Figure 4:
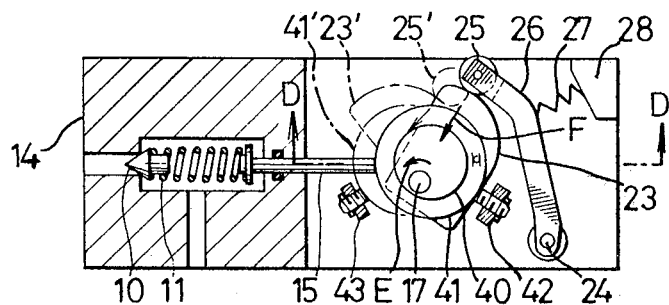
FIG. 4 is a partly sectional view of another embodiment of the invention.
Figure 5:
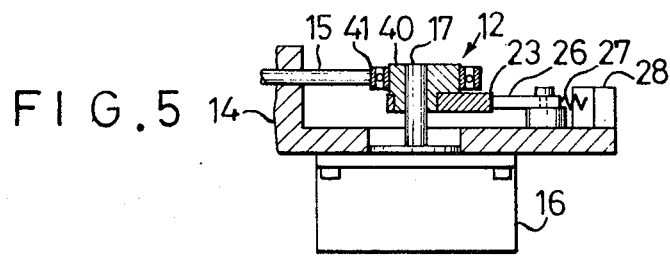
FIG. 5 is a sectional view taken on the line D—D of FIG. 4.

FIGS. 4 and 5 show another embodiment of the invention. It employs a power input means 12 which dispenses with the screw 20 of FIG. 2 and directly displaces the push pin 15 with a cam for spring compression on the pulse motor shaft 17, for example with a rotary disc 40, which can be provided with a bearing 41, being rigidly mounted off-center on the pulse motor shaft 17. The backup force-generating mechanism 13 includes a cam 23 for backup force generation directly fixed to the pulse motor shaft 17. The remaining parts are all like the counterparts in FIGS. 2 and 3. Now, if the rotary disc 40 is rotated in the direction of the arrow E to compress the spring 11 by means of the push pin 15, then the reaction force of the spring 11 will act, counter to the direction of the arrow E, on the pulse motor 16, while the backup force by the arm 26 will work in the direction E. In this embodiment, too, when the pulse motor is in the original position as indicated by full lines, the line of action of the force F exerted by the arm 26 extends through the center of the shaft 17, and therefore the backup force is nil. The backup force grows increasingly in proportion to the reaction force of the spring 11 with the rotation of the cam 23 until the maximum displacement has been attained as indicated by alternate long and two short dashed lines. As is the case with the embodiment of FIG. 2, the load torque on the pulse motor 16 is zero at any moment. Stoppers 42, 43 are installed for setting the original and maximum displacement positions, respectively.

Figure 6:
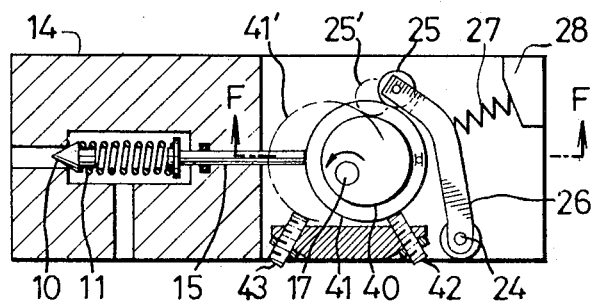
FIG. 6 is a partly sectional view of still another embodiment of the invention.
Figure 7:
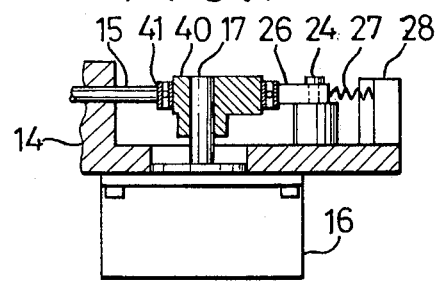
FIG. 7 is a sectional view taken on the line F—F of FIG. 6.

Still another embodiment of the invention is shown in FIGS. 6 and 7. With fundamentally the same construction as that illustrated in FIG. 4, this embodiment uses an eccentric rotary disc 40 and a bearing 41 which serve as a cam for spring compression and also as a cam for backup force generation omitting the cam 23 for backup force generation in FIG. 4, in the backup force-generating mechanism, with the arm 26 in direct engagement with the bearing 41.

This embodiment is also capable of exerting a backup force, counter to the reaction force of the spring 11, on the pulse motor 16. However, because the cam 23 has been replaced by the bearing 41 of a certain radius of curvature, the magnitude of the backup force cannot be made exactly equal to that of the reaction force of the spring 11. In other words, only the backup force substantially proportional in magnitude to the reaction force is obtained.

Figure 8:
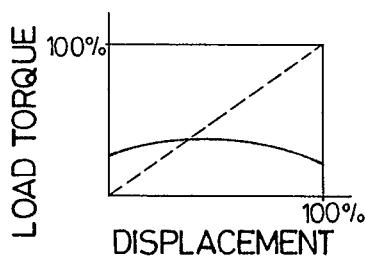
FIG. 8 is a displacement-load torque characteristic curve.

FIG. 8 is a graph showing the relationship between the displacement of the spring 11 and the load torque of the pulse motor 16. The broken line represents the relation attained without the backup force-generating mechanism of the invention, and the full-line curve represents the relation attained with the embodiment shown in FIG. 6.

As described above, the pressure control valve according to this invention includes the backup force-generating mechanism 13 for imparting the power input means with a backup force having a magnitude proportional to the reaction force of the spring 11 as a displacement-force converting element and which is exerted counter to the direction of the reaction force. Consequently, even when the reaction force is great, the load on the input means 12 can be made small enough or naught, and high speed driving with a small actuating force is rendered possible. This advantage is particularly remarkable where a small power input means, e.g., a small pulse motor, is to be employed. Where the backup force-generating mechanism uses a cam of a suitably chosen radius of curvature as in the embodiment of FIG. 2 or 4, the reaction and backup forces can be made completely equal in magnitude, reducing the load on the input means to zero.

It is to be understood that the present invention is not limited to the embodiments thereof as far described but may be variously changed or modified without departing from the spirit and scope of the invention. For example, the input means may be, aside from the pulse motor, any positionally controllable motor, such as a DC motor equipped with a potentiometer, or other manual or mechanical displacement means. As for the displacement-force convertion element, anything equivalent to the spring may be used and it may be remotely handled with a flexible wire. The pressure control valve may take any other form than the poppet type, e.g., it may be a spool or nozzle flapper type. Further, while the embodiments in FIGS. 4 to 7 include a rotary disc directly mounted on the rotating shaft of the pulse motor, it is alternatively possible to connect the motor shaft and a shaft of the rotary disc via a reduction gear. The cam for backup force generation in FIG. 2 may be supplanted by an eccentric disc.

What is claimed is:

1. In a pressure control valve including a valve, a spring for pressing the valve, and a power input means for compressing the spring, the improvement which comprises a backup force-generating mechanism for producing and directing a backup force counter to the direction in which the reaction force due to the compression of said spring is exerted on said input means, so as to impart said backup force to said input means said backup force-generating mechanism comprising a cam for backup force generation connected to said power input means to turn in proportion to the amount of input displacement of said input means, and a cam presser means for producing a cam-turning force that varies with the turning of said cam.

2. A pressure control valve according to claim 1, wherein said cam has a gradually changed radius of curvature.

3. A pressure control valve according to claim 1, wherein said cam is an eccentric rotary disc.

4. A pressure control valve according to claim 1, wherein said cam presser means comprises a turnably pivoted arm having a cam-pressing part, and an elastic element for pressing said arm against said cam.

5. A pressure control valve according to claim 1, wherein said power input means comprises a rotation angle-controlled motor and a screw adapted to be turned by said motor for forward and rearward movements.

6. A pressure control valve according to claim 1, wherein said power input means comprises a rotation angle-controlled motor and a cam for spring compression adapted to be turned by said motor.

7. A pressure control valve according to claim 6, wherein said cam for spring compression is an eccentric rotary disc.

8. A pressure control valve according to claim 7, wherein said eccentric rotary disc is used to serve also as said cam for backup force generation.

9. A pressure control valve according to claim 7, wherein said motor and said eccentric rotary disc have a reduction gear disposed therebetween.

* * * * *